(12) United States Patent
Ito et al.

(10) Patent No.: US 7,433,592 B2
(45) Date of Patent: Oct. 7, 2008

(54) DIGITAL CAMERA

(75) Inventors: Ryohei Ito, Nagano (JP); Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/304,887

(22) Filed: Dec. 16, 2005

(65) Prior Publication Data

US 2006/0098972 A1    May 11, 2006

Related U.S. Application Data

(63) Continuation of application No. PCT/JP2004/008437, filed on Jun. 16, 2004.

(30) Foreign Application Priority Data

Jun. 18, 2003  (JP)  ............................. 2003-173432

(51) Int. Cl.
G03B 17/18    (2006.01)
(52) U.S. Cl. .................... 396/284; 348/231.1
(58) Field of Classification Search .............. 396/281, 396/287, 284; 348/231.1; 352/170
See application file for complete search history.

(56) References Cited

U.S. PATENT DOCUMENTS

| | | | | |
|---|---|---|---|---|
| 5,130,742 A | * | 7/1992 | Miyamoto et al. | 396/292 |
| 5,365,292 A | * | 11/1994 | Wakabayashi et al. | 396/281 |
| 5,450,151 A | * | 9/1995 | Urata et al. | 396/281 |
| 5,506,651 A | * | 4/1996 | Tsukahara et al. | 396/281 |
| 5,521,671 A | * | 5/1996 | Aoki et al. | 396/281 |
| 5,614,980 A | * | 3/1997 | Wakabayashi et al. | 396/147 |
| 5,708,881 A | * | 1/1998 | Tsukahara et al. | 396/281 |
| 5,732,296 A | * | 3/1998 | Katano et al. | 396/281 |
| 5,794,086 A | * | 8/1998 | Wakabayashi et al. | 396/284 |
| 6,275,212 B1 | * | 8/2001 | Ohtani et al. | 345/110 |
| 6,407,287 B2 | * | 6/2002 | Matsumoto et al. | 562/532 |
| 6,407,772 B2 | * | 6/2002 | Mizoguchi | 348/220.1 |
| 6,510,287 B1 | * | 1/2003 | Tsukahara et al. | 396/281 |

FOREIGN PATENT DOCUMENTS

| | | | |
|---|---|---|---|
| JP | 4-137868 A | | 5/1992 |
| JP | 5-75966 A | | 3/1993 |

(Continued)

OTHER PUBLICATIONS

Special Supplement of Digital Camera Magazine Aug. 2002 issue "Nikon D100 perfect master—Function Explanation Edition" Aug. 1, 2008, Impress Corporation, pp. 7, 18, 19, 21-22.

(Continued)

*Primary Examiner*—W. B. Perkey
(74) *Attorney, Agent, or Firm*—Sughrue Mion, PLLC

(57)   ABSTRACT

A digital camera allowing a user to easily check shooting conditions with low power consumption is to be provided. The digital camera includes a display unit having a display panel on which a plurality of shooting conditions are displayed and an indicator needle, a driving unit for driving the indicator needle in response to an input given by a user and indicating one of the shooting conditions by using the indicator needle, and an image pick-up unit for converting an optical image formed by an optical system to a digital image on the basis of the shooting condition indicated by the indicator needle.

6 Claims, 3 Drawing Sheets

FOREIGN PATENT DOCUMENTS

| | | |
|---|---|---|
| JP | 5-232569 A | 9/1993 |
| JP | 5-333418 A | 12/1993 |
| JP | 5-333420 A | 12/1993 |
| JP | 6-30320 A | 2/1994 |
| JP | 2000-101964 A | 2/1994 |
| JP | 06-273838 A | 9/1994 |
| JP | 8-43911 A | 2/1996 |
| JP | 8-262550 A | 10/1996 |
| JP | 2595170 Y2 | 3/1999 |
| JP | 11-177857 A | 7/1999 |
| JP | 2000-152060 A | 5/2000 |

OTHER PUBLICATIONS

Nikon D100 Instruction published by Nikon Corporation, p. 42; downloaded from http://10.0.21.24/dtmp_dir/2008021816/3755/DBU9561611120328686916719c08..., Feb. 18, 2008.

* cited by examiner

DIGITAL CAMERA

This is a Continuation of International Application No. PCT/JP2004/08437 filed Jun. 16, 2004 and which claims priority from Japanese Patent Application No. 2003-173432 filed on Jun. 18, 2003, the above-noted applications incorporated herein by reference in their entirety.

BACKGROUND OF THE INVENTION

The present invention relates to a digital camera.

Generally, a digital camera in which a displaying mode of a Liquid Crystal Display (LCD) is indicated by an indicator needle has been known (for example, the patent reference 1). A wrist-worn type electronic camera (digital camera) disclosed in the patent reference 1 has a watch function. Thus, during a camera mode in which the wrist-worn type electronic camera functions as a digital camera, the displaying mode of an LCD is indicated by at least one of an hour hand, a minute hand or a second hand provided to the watch function. The wrist-worn type electronic camera disclosed in the cited reference 1 has three modes, that is, a photographing mode, a reproduction mode and a delete mode, as the displaying mode, and any mode among those displaying modes is indicated in accordance with a setting by a user.

Further, a typical digital camera displays various shooting conditions, such as white balance and compression ratio, and the number of remaining frames to be additionally stored in a storage unit on an LCD. This allows a user to check the shooting conditions and the number of remaining frames.

Since the indicator needle of the digital camera disclosed in the cited reference 1 indicates only the displaying mode of an LCD, a user can not check various shooting conditions.

Further, for a typical digital camera, since an LCD device should be on state in order to check shooting conditions and the number of remaining frames, a user has a burden to turn on the LCD before checking the shooting conditions. Still further, power consumption increases since the LCD consumes the power. Furthermore, in case that the LCD is not in a mode to display shooting conditions shortly after turning on the LCD, it takes a time to switch the mode to display shooting conditions.

Patent reference 1: JP-A-2000-152060.

SUMMARY OF THE INVENTION

The present invention has been designed in view of the problems, and an object of the present invention is to provide a digital camera allowing a user to easily check shooting conditions with low power consumption.

Another object of the invention is to provide a digital camera allowing a user to easily check the number of remaining frames with low power consumption.

In order to accomplish the above objects, the present invention provides a digital camera including a display unit with an indicator needle and a display panel on which various shooting conditions are shown; a driving unit for driving the indicator needle in response to an input given by a user and indicating any shooting conditions by the indicator needle; and an image pick-up unit for converting an optical image formed by an optical system to a digital image on the basis of the shooting conditions indicated by the indicator needle. According to this digital camera, a user can check the shooting conditions by the indicator needle. In case of indicating the shooting conditions by the indicator needle, since there is almost no power consumption except for the time for driving the indicator needle, power consumption can be reduced.

Further, according to this digital camera, it is easy to check the shooting conditions because it is not required for a user to operate additionally when checking the shooting conditions. Accordingly, in accordance with this digital camera, it is possible to easily check shooting conditions with low power consumption.

The display panel may show white balance as a shooting condition. In case that the white balance is shown, the white balance is easily checked.

The display panel may show a compression ratio as a shooting condition. In case that a compression ratio is shown, the compression ratio can be easily checked.

The driving unit may drive the indicator needle to point to a predetermined position when the power is turned off. In accordance with this digital camera, power on/off can easily be identified by a user.

The indicator needle may indicate the shooting conditions set right before the power is turned off even during the power-off state. In accordance with this digital camera, since the indicator needle indicates the shooting conditions as set right before the power is turned off even during the power-off, the shooting conditions are easily checked even though the power is off.

To achieve the above object of the present invention, there is provided a digital camera including an image pick-up unit for converting an optical image formed by an optical system to a digital image with amount of data which is variable depending on the shooting condition which is set; a storage unit for storing the digital image; a display unit having an indicator needle and a display panel which has graduations representing the number of frames thereon; and a driving unit for indicating the remaining digital image frame number to be stored in the storage unit by the indicator needle. According to this digital camera, the number of remaining frames can be indicated by the indicator needle. In case of indicating the shooting conditions by the indicator needle, since there is almost no power consumption except for the time for driving the indicator needle, power consumption can be reduced. Further according to this digital camera, when checking the remaining digital image frame number, to be stored in the storage unit, (hereinafter, "the remaining digital image frame number, to be additionally stored in a storage unit" is referred as "the number of remaining frames"), there is no need for a user to give any operations, so that it is easy for a user to check the number of remaining frames. Thus, this digital camera allows a user to easily check the number of remaining frames with low power consumption.

The driving unit can drive the indicator needle on the basis of the remaining capacity of the storage unit and shooting conditions. In case that it allows a user to set shooting conditions related to data size of image such as resolution and compression ratio, such shooting conditions and the remaining capacity of a storage unit affects the number of remaining frames. Accordingly, in the case that the shooting conditions can be adjusted, by driving the indicator needle on the basis of such shooting conditions and the remaining capacity of the storage unit, the digital camera can show the exact number of remaining frames.

As for the graduations, the number of frames represented by a unit interval between graduations may increase from a starting point to an ending point of the graduations. In accordance with this digital camera, it is possible to properly inform a user of the number of remaining frames although an area to be graduated is limited.

The graduations may be marked in one frame division when the number of remaining frames falls within a predetermined range, i.e. when the number of remaining frames decreases below a predetermined number. When the number of remaining frames becomes small, a user has a great regard for the number of remaining frames while taking pictures. It is possible to add ease of use to a digital camera by precisely showing the number of remaining frames by one frame when the number of remaining frames falls within a predetermined small range.

Further, in the digital camera according to the present invention, the driving unit can drive the indicator needle to point to a predetermined position when the power is turned off. According to this digital camera, a user can easily notice on/off state of the power.

Still further, the digital camera according to the present invention can indicate the number of remaining frames which are available right before the power is turned off by the indicator needle even while the power is off. In accordance with this digital camera, even while the power is off, it is possible to indicate the number of remaining frames which are available right before the power is turned off, so that a user may easily check the number of remaining frames even if the power is turned off.

Furthermore, the digital camera according to the present invention may further include a Liquid Crystal Display (LCD) for displaying the digital images thereon. In accordance with this digital camera, a user can view the digital images on the LCD.

Furthermore, each function of a plurality of units constituting the present invention can be realized in a hardware resource with functions which are specified by its construction, a hardware resource with functions which are specified by programs or a combination of both. In addition, each function of a plurality of the units is not limited to be realized in the hardware resources which are physically separated.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Modes for charring out the invention is described below with reference to a plurality of embodiments.

First Embodiment

Figure 2:
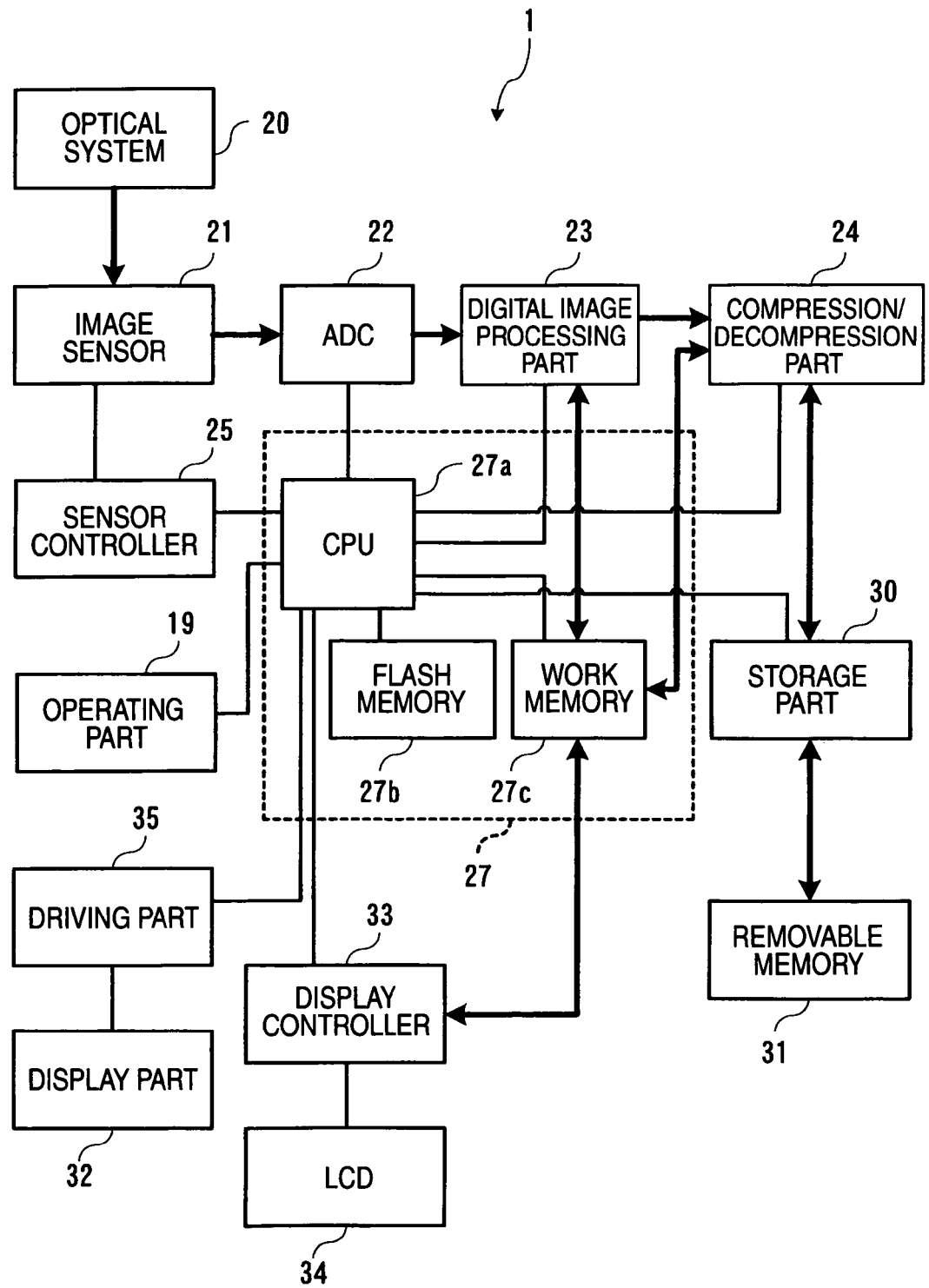
FIG. 2 is a block diagram of the digital camera according to the embodiment of the present invention.

FIG. 2 is a block diagram showing a hardware constitution of a digital still camera 1 as a digital camera according to a first embodiment of the present invention.

A controlling part 27 includes a CPU 27a, a flash memory 27b and a work memory 27c. The CPU 27a controls the whole of the digital still camera 1 by executing computer programs stored in the flash memory 27b. Further, the CPU 27a also serves as a display unit, a driving unit, and an image pick-up unit by executing computer programs stored in the flash memory 27b. The flash memory 27b is a memory for storing various computer programs or data. The flash memory 27b can store various programs or data downloaded from a certain server through a network, and store various programs or data read from computer-readable storage media such as a removable memory 31. The work memory 27c is a memory for temporarily storing computer programs or data.

An optical system 20 includes a lens and a diaphragm. The optical system 20 forms an optical image of an object to a light-receiving surface of an image sensor 21. The image sensor 21 serving as the image pick-up unit is an area image sensor having pixels discretely arranged on a two-dimensional space and a charge transfer element such as a charge coupled device (CCD). The image sensor 21 is driven by a sensor controller 25. The image sensor 21 accumulates charges for each pixel for a predetermined time, and outputs an electrical signal corresponding to the amount of light received by a pixel. The charges are acquired by converting an optical image that is formed by the optical system 20 by a photo-electric conversion technique. The image sensor 21 can form a color image by arranging a complementary filter consisted of Cyan (C), Magenta (M), Yellow (Y) and Green (G), or a primary-color filter consisted of Red (R), Green (G) and Blue (B).

An A/D converter (ADC) 22 as the image pick-up unit converts the electrical signal output from the image sensor 21 to a digital signal by quantization. For example in more detail, the ADC 22 performs a reduction process of noises contained in the electrical signal, a level adjustment process of the electrical signal by adjusting gain and a quantization process.

A digital image processing part 23 as the image pick-up unit performs an image formation process, white balance compensation, gamma compensation and color space conversion with respect to the digital signal output from the ADC 22, and forms a digital image representing gray scale values of R, G and B, or gray scale values of Y, Cb and Cr with respect to each pixel. Here, the image formation process means a process for outputting a digital image with three gray scale values of RGB or YCbCr for each pixel by interpolating brightness information of one color output from a pixel to brightness information of another color of a neighboring pixel. The white balance compensation is a process to compensate so that a white object looks white without depending on the kind of light sources. Generally, in a digital camera, a white object looks white when it is photographed in the sun light, but looks red-tinged when it is taken under a glow lamp indoor. Accordingly, a white object is compensated so as to look white also on a digital image by the white balance compensation. Since how to compensate white balance depends on light sources, the digital still camera 1 allows a user to select one of the light sources as the white balance and compensates the white balance to match with the light source selected.

A compression/decompression part 24 as the image pick-up unit compresses a made digital image and decompresses the compressed digital image. The compression/decompression part 24, for example in more detail, compresses in JPEG format which is an irreversible compression method with loss of data or in a reversible compression method with lossless of data. Further, the compression/decompression part 24, also, may be constituted to convert a digital image to a TIFF format, in which data compression is not performed. In the case of TIFF format, there is "no compression." A digital image of either of the reversible compression format or the TIFF format has high image quality since it is an uncompressed image, but the TIFF format of digital image has much larger amount of data than the irreversible compression format of digital image. Since JPEG format is variable in compression ratio, a large amount of data is discarded to reduce the total amount of data when it is compressed with a high compression ratio. Accordingly, when the compression ratio is high, the quality of the digital image is degraded. On the contrary, when the compression ratio is low, the amount of data discarded is not much, so that the digital image made after compression has relatively larger amount of data in comparison with that when the compression ratio is high, but can reduce the degree of degradation of image quality.

A storage part 30 as the storage unit may include a card slot to contact the removable memory 31 and a memory controller. The storage part 30 controlled by the controlling part 27, writes the digital image compressed by the compression/decompression part 24 into the removable memory 31 and reads the digital image stored in the removable memory 31.

A driver 35 as the driving unit includes a stepping motor to drive an indicator needle 55 (shown in FIG. 1B), a stepping motor to drive an indicator needle 54 (shown in FIG. 1B), a stepping motor to drive an indicator needle 53 (shown in FIG. 1B), a stepping motor to drive an indicator needle 52 (Shown in FIG. 1B), and a driving circuit. The driver 35 controlled by the controlling part 27, drives the indicator needles 53 and 54 in response to an input given by a user, and shows any of the shooting conditions by the indicator needles 53 and 54. Further, the driver 35 drives the indicator needle 55 on the basis of the remaining capacity of the removable memory 31 contacting the storage part 30 and the shooting conditions which are set, and indicates the remaining digital image frame number, which can be additionally stored in the removable memory 31 by the indicator needle 55. Still further, the driver 35 drives the indicator needle 52 on the basis of the remaining life of a battery (not shown) and shows the remaining life of the battery by the indicator needle 52.

A Liquid Crystal Display (LCD) 34 is controlled by a display controller 33 and displays digital images and a plurality of kinds of setting menus thereon.

The display controller 33 includes a frame buffer for storing data corresponding to one frame of the LCD 34 and a display circuit for driving the LCD 34 on the basis of the data stored in the frame buffer.

Figure 1A:
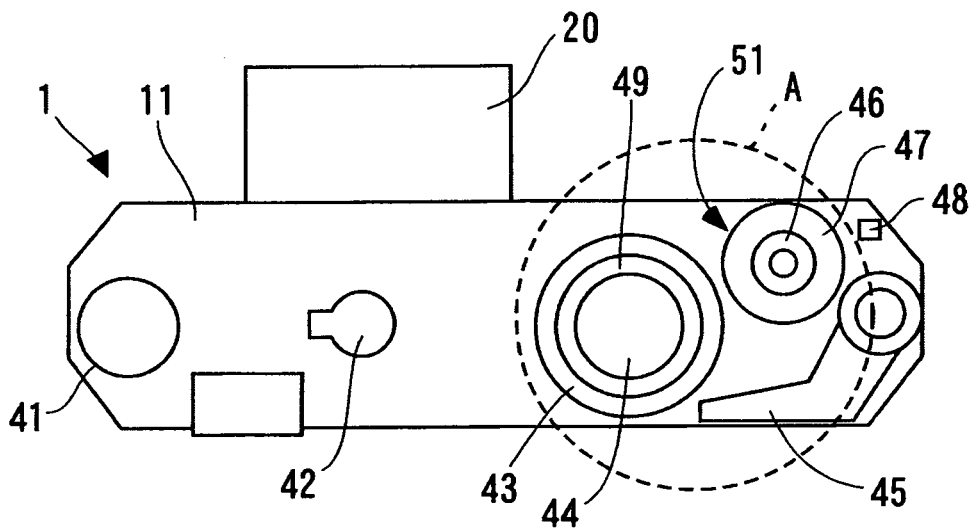
FIG. 1A is a top view of a digital camera according to an embodiment of the present invention.
Figure 1B:
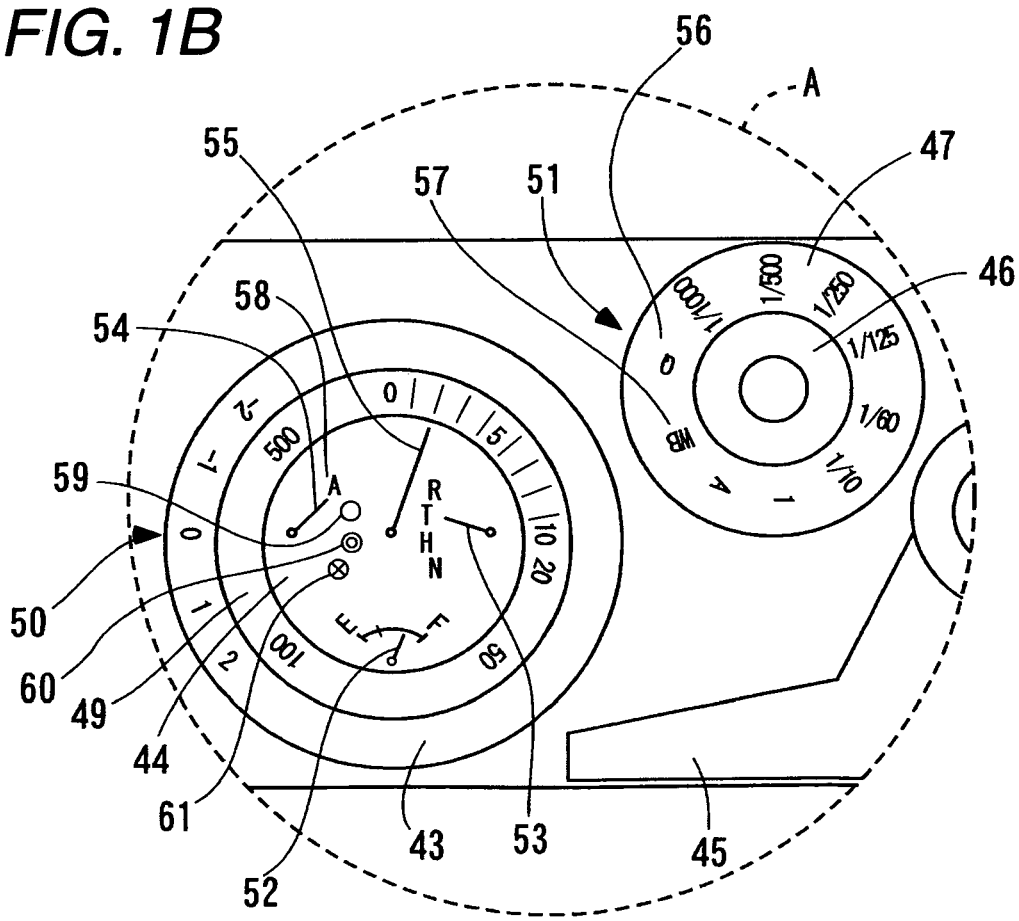
FIG. 1B is an enlarged view of a part A, which is marked by a dotted circle, of the digital camera shown in FIG. 1A.

FIG. 1A is a top view of a digital still camera 1 and FIG. 1B is an enlarged view of a part A, marked by the dotted circle, shown in FIG. 1A.

A display part 32 (shown in FIG. 2) as the display unit includes a display panel 44 of a circular panel shape as shown in FIGS. 1A and 1B, a display panel 49 with a ring frame shape, and indicator needles 52, 53, 54 and 55.

White a plurality of balances and a plurality of compression ratios are displayed on the display panel 44 as a plurality of shooting conditions. Further, the display panel 44 may have graduations representing the remaining life of a battery which is the power of the digital still camera 1 besides the display of white balance and compression ratio. As the method of representing white balance, the display panel 44 displays a plurality of symbols representing light sources or the automatic mode in which the right sources are automatically selected by the digital still camera 1. Here, reference numeral 58 denotes "Auto mode," reference numeral 59 denotes "day light (sun light)," reference numeral 60 denotes "cloudiness," and reference numeral 61 denotes "glow light". A user operates an operating part 19 to be described below for driving the indicator needle 54 to point to the intended symbol. For example, when manipulating the operating part 19 so as for the indicator needle 54 to point to the symbol 61, compensation is made to match white balance to the light source of "glow light" with respect to the digital image. Compression ratios are represented by symbols "R," "T," "H," and "N" in figures. Here, the alphabetical symbol "R" means RAW format, and "T" means TIFF format. "N" (Normal) and "H" (High) are JPEG format, "N" means a high compression ratio, and "H" means a low compression ratio. How to set compression ratios of "N" and "H" is a matter freely selectable depending on the design. The graduations with alphabetical symbols "E" (Empty) and "F" (Full) marked on the display panel 44 represent the remaining life of a battery.

Further, even though white balance and compression ratio are disclosed as exemplary shooting conditions in the first embodiment of the present invention, in case that an optical image is converted to a digital image in response to shooting modes such as normal, Portrait, Landscape, and Macro, the shooting modes may be served as shooting conditions.

The display panel 49 has a ring shape and is arranged in such a way that its center is fitted to the center of the display panel 44. The internal diameter of the display panel 49 is approximately the same as the diameter of the display panel 44. The display panel 44 disposed in an opening of the display panel 49 is covered with a transparent material such as glass. On the display panel 49, frame-number graduations representing the number of remaining frames are marked in such a way that the number of frames represented by a unit interval between graduations increases toward the ending point from the starting point of the graduations. In an example shown in drawings, the frame-number graduations are marked to represent the number of frames in the range of 0 to 500, 0 is marked at the starting point and 500 is marked at the ending point of the graduations. For example, the graduations are marked in such a way that the number of image frames represented by amplitude of a unit variation of the indicator needle 55 when the number of frames is in the range of 0 to 10 is different from the number of frames represented by amplitude of a unit variation of the indicator needle 55 when the number of frames is in the range of 10 to 20. Here, the amplitude of a unit variation is set only as a matter of convenience to explain the marking rule of the graduations, is a predetermined angle (for example, 5 degrees) which is invariable over the full range of the number of frames, and corresponds to a unit interval between graduations as set forth in the claims. For example in detail, the frame-number graduations are marked in one frame division in the range of 0 to 10 on the display panel 49. Given that, amplitude of variation of the indicator needle 55 in the range of 0 to 10, corresponding to one frame, is called amplitude of a unit variation, amplitude of a unit variation in the range of 10 to 20 corresponds to about 5 to 10 frames. As described above, the number of image frames represented by a unit interval between graduations becomes larger in the range of 10 to 20 frames than in the range of 0 to 10 frames. In the same manner, the number of frames represented by a unit interval between graduations becomes larger in the range of 100 to 500 than in the range of 10 to 100. That is, the frame-number graduations are marked in such a way that the number of frames represented by a unit interval between graduations increases from the starting point toward the ending point. Generally, when a large number of remaining frames is available, (for example not lower than 100 frames), it is satisfactory that the number of remaining frames is roughly checked by a large number of frames (for example by 100 frames), so that a user is not willing to precisely check the number of remaining frames by a small number of frames (for example, by one frame). Accordingly, it is proper to roughly show the number of remaining frames by a large number of frames when a large number of remaining frames (not lower than 100) are available. On the contrary, since a user has a great regard for the number of remaining frames by every shot, while taking pictures when a small number of remaining frames is available, it is proper to precisely show the number of remaining frames by one frame in the range where the number of remaining frames is small (for example not greater than 10). If the frame-number graduations are marked in such a way that the number of remaining frames represented by a unit interval between graduations increases from the starting point to the ending point, it can show a wide range of the number of remaining frames by a small amplitude of variation at the ending point of the graduations, so that it is possible to reduce an area demanded to mark the graduations. When the amplitude of variation of the indicator needle 55, which corresponds to one frame, is narrow, it is difficult for a user to check the number of remaining frames by one frame. However, even in case that the amplitude of variation of the indicator needle 55, which corresponds to one frame, is narrow, it is possible for a user to roughly check the number of remaining frames. Accordingly, at the ending point where it is not needed to precisely check the number of remaining frames by a small number of frames, a user can check the number of remaining frames with satisfactory accuracy even though an interval between graduations, corresponding to one frame, becomes narrower. Accordingly, if the frame-number graduations are marked in such a way that the number of frames represented by a unit interval between graduations increases from the starting point to the ending point, it is possible to give information to a user with satisfactory accuracy and reduce an area needed to mark the graduations. Further, if the frame-number graduations are marked in such a way that the number of frames represented by a unit interval between graduations increases from the starting point to the ending point, it is possible to properly inform a user of the number of remaining frames with a limited area where the graduations can be marked.

The operating part 19 includes a dial switch 47 serving as the driving unit as set forth in claim 1, a dial switch 41 serving as the driving unit as set forth in claim 1, and a shutter button 46 for triggering a shooting operation. The dial switch 47 is a switch to select a shutter speed and a kind of shooting conditions. The dial switch 41 is a switch to select a shooting condition intended by a user out of the selected kind of shooting conditions. In addition, the manipulation unit 19 further includes a dial switch 43, a switching switch 42 and an advanced lever 45. The dial switch 43 is a switch to set sensitivity of a pixel, and the switching switch 42 is a switch to switch an angle of view. The advanced lever 45 is provided to succeed maneuverability of a film camera 45, and the shutter button 46 may be pressed down by performing advancing operation using the advanced lever 45. The operating part 19 may further includes a manipulation switch (not shown) to display digital images stored and a plurality kinds of setting menus on the LCD 34, or operate the setting menus displayed.

The description made above refers to a hardware constitution of a digital still camera. Next, the operation of the digital still camera 1 will be explained below.

When photographing, at first, a user turns on the power of the digital still camera 1 using the power switch (not shown).

When the power is turned on, the controlling part 27 drives the indicator needles 53 and 54 pointing to predetermined positions so as to indicate the shooting conditions which are set. Further, a description on how the shooting conditions are set will be made below. As for the indicator needle 55, after the number of remaining frames which is available right after the power is turned on is grasped, and the indicator needle 55 pointing to a predetermined position is driven to indicate the number of remaining frames gasped. Explanation about the predetermined position will be made below. A process of grasping the number of remaining frames available right after the power is turned on is performed because the number of remaining frames grasped after the power-on can be different from the number of remaining frames which is available right before the power-off due to a certain reason, for example, the removable memory 31 may be replaced during the power-off. The controlling part 27 grasps the remaining capacity of the removable memory 31 by controlling the storage part 30, obtains the number of frames available to be additionally stored (the number of remaining frames) in the removable memory 31 on the basis of the grasped remaining capacity and the compression ratio which is currently set, and drives the indicator needle 55 to indicate an angle corresponding to the obtained number of remaining frames by controlling the driver 35. In more detail, the number of remaining frames can be obtained either by dividing the remaining capacity by amount of data corresponding to the compression ratio which is currently set, remembering average amount of data by a compression ratio in advance, or by specifying the number of remaining frames in a table format on the basis of the grasped remaining capacity and the currently set compression ratio, remembering relationships between the remaining capacity and the number of remaining frames by a compression ratio in the table format in advance.

Next, a user operates the operating part 19 according to his/her demand, and sets the shooting conditions of white balance and compression ratio. When setting the shooting conditions, a user, at first, rotates the dial switch 47 and matches the symbol of reference numeral 56 or the symbol of reference numeral 57, representing the kind of shooting conditions, written on the dial switch 47, to a triangle mark 51. Here, the symbol denoted by reference numeral 56 represents a compression ratio as a kind of shooting condition. The symbol denoted by reference numeral 57 represents white balance. By the symbols denoted by reference numeral 56 and 57, either kind of the shooting conditions to be set is determined. Next, the user rotates the dial switch 41. When the dial switch 41 is rotated, the controlling part 27 drives the indicator needle in response to an input given by user. In more detail, for example, the controlling part 27 controls the driver 35 so as for the indicator needle corresponding to the selected kind of shooting condition to be rotated by an angle in response to the rotated angle of the dial switch 41. The controlling part 27 stores the shooting condition corresponding to the rotated angle of the dial switch 41 into the flash memory 27b. The shooting condition recognized by the controlling part 27 is identical to the shooting condition indicated by the indicator needle after the indicator needle is rotated. Thus, the shooting condition is set. Further, even though the indicator needles 53 and 54 are electrically driven by the driver 35 in the first embodiment of the present invention, for example, the indicator needles 53 and 54 may be also mechanically driven by a cogwheel which transfers the force exerted when a user rotates the dial switch 41 to the indicator needles 53 or 54. A user checks whether the indicator needle indicates the desired shooting condition after it is rotated, and repeats manipulations of the dial switch 41 until the indicator needle indicates the intended shooting condition if it is wrong. Meanwhile, the shooting condition currently set is acceptable, additional manipulations are not needed.

Further, in the first embodiment of the present invention, a user gives an input by rotating manipulation of the dial switches 47 and 41. However, for example, a user can also give an input by selecting a shooting condition from a menu displayed on the LCD 34 after setting menus provided for setting shooting conditions are displayed. The controlling part 27 can drive the driver 35 in accordance with the selected shooting condition.

When the shutter button 46 is pressed down by the user, the controlling part 27 controls each unit, and the digital camera 1 converts an optical image which is formed by the optical system 20 to a digital image on the basis of the shooting conditions set. That is, on the basis of the shooting conditions indicated by the indicator needles 53 and 54, the digital camera 1 converts an optical image to a digital image. For example, if "day light" is set as white balance, the controlling part 27 controls the digital image processing part 23 to perform white balance correction to match white balance to "day light". In the same manner, the controlling part 27 controls the compression/decompression part 24 to compress an image at the compression ratio which is set. Further, in the first embodiment of the present invention, even though the compression ratio is referred as the exemplary shooting condition set, the shooting condition may be the number of pixels, arranged in rows and columns, of the digital image, i.e. size of an image frame. That is, the digital camera 1 can convert an optical image to a digital image with an image size set.

Next, the controlling part 27 controls the storage part 30, and stores the converted digital image into the removable memory 31.

Then, the controlling part 27 grasps the remaining capacity of the removable memory 31 from the storage part 30 and updates the angle of the indicator needle 55.

Figure 3:
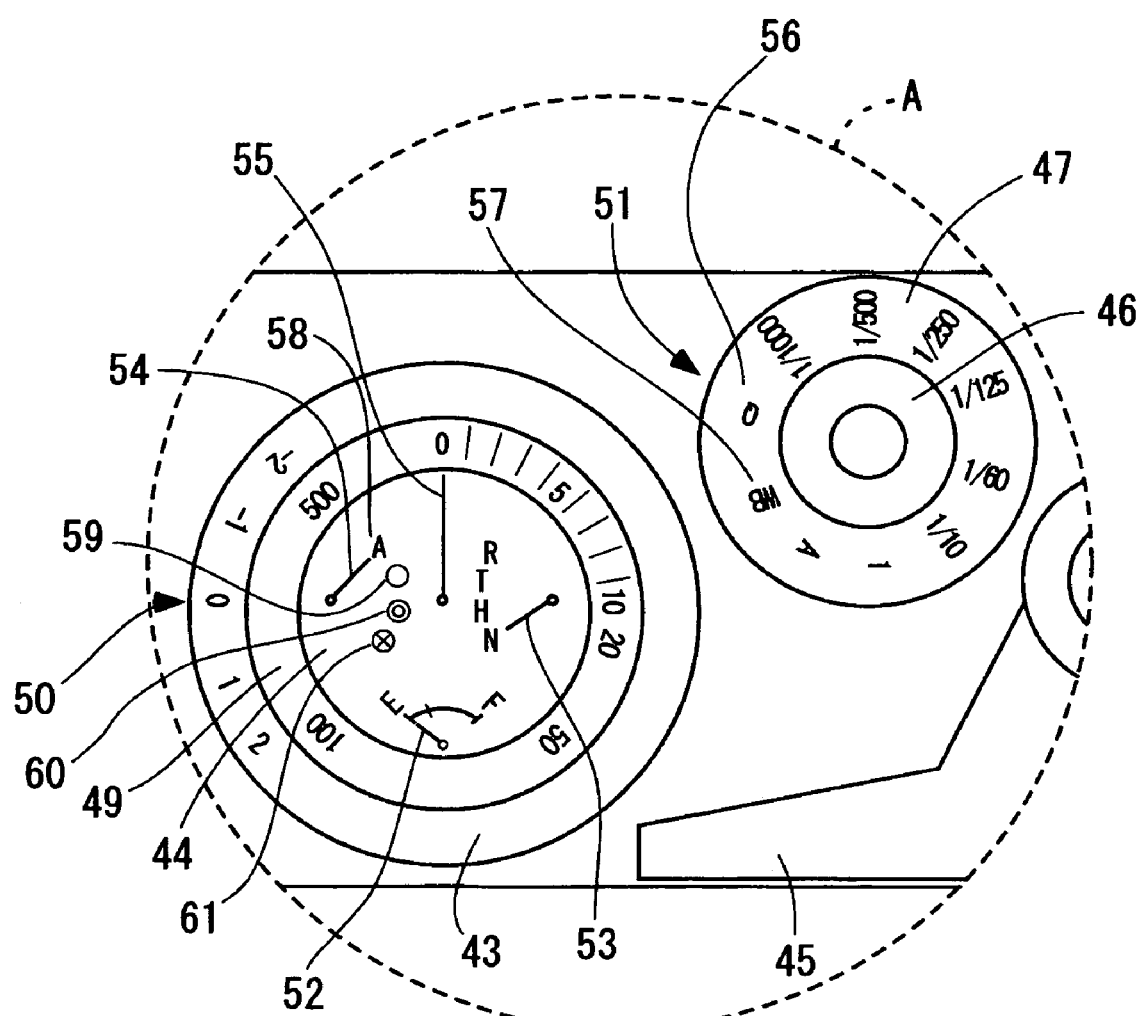
FIG. 3 is a top view of a digital camera according to the embodiment of the present invention.

When the power is turned off by a user after photographing is ended, the controlling part 27 controls the driving part 35 and drives all the indicator needles to point to the predetermined positions as shown in FIG. 3 before the digital camera 1 is turned off. Here, in the first embodiment of the present invention, the predetermined position of the indicator needle 53 is "N," the predetermined position of the indicator needle 54 is "A," the predetermined position of the indicator needle 52 is "E" and the predetermined position of the indicator needle 55 is "O." Further, the predetermined positions can be properly set as a matter of convenience. In case that it is designed for all the indicator needles to point to a predetermined position altogether, a user can check the digital still camera 1 is turned off by the position of the indicator needles. On the contrary, when the digital still camera is turned on, since the entire indicator needles are simultaneously driven, a user can visually identify that the digital still camera 1 is turned on. Accordingly, it is easy to check whether the power is on or off.

In accordance with the digital still camera 1 according to the first embodiment of the present invention as described above, it is possible to check digital still camera's peculiar shooting conditions such as white balance and compression ratio by indicator needles. In case of displaying shooting conditions by the indicator needles, since almost no power is consumed except for power consumption needed to drive the indicator needles, only smaller power is needed in comparison with a case that the shooting conditions are displayed on the LCD 34. Further, since it does not give a user any manipulation burden to switch the displaying mode to check the shooting conditions, a user can easily check the shooting conditions. Thus, in accordance with the digital still camera 1, it is possible to easily check the shooting conditions with low power consumption.

In addition, according to the digital still camera 1, since it is possible to check the number of remaining frames by indicator needles, a process of checking the number of remaining frames can be easily performed with low power consumption.

Further, according to the digital still camera 1, since the display panel 44 is arranged inside of the display panel 49, different kinds of graduations for showing a plurality of shooting conditions and the number of remaining frames come into one spot. Therefore, according to the digital camera 1, a user can check a plurality of shooting conditions and the number of remaining frames at a glance. Meanwhile, the display panel 44 may be arranged outside of the display panel 49.

Still further, in the first embodiment of the present invention, explanation is made in reference to the digital still camera 1, but the present invention can be applied to a digital video camera.

Second Embodiment

A digital camera according to a second embodiment of the present invention indicates the number of remaining frames which is available right before the power is turned off even during the power-off by the indicator needle.

As for a stepping motor of the digital still camera regarding the second embodiment, for example, frictional force between a driving shaft and a retainer is much greater than a force exerted when turning moment generated by the indicator needles in response to a pose of a digital still camera makes the driving shaft rotate. Accordingly, in the second embodiment of the present invention, during the power-off of the digital still camera, it does not happen that positions pointed by the indicator needles 52, 53, 54 and 55 are changed.

The digital still camera according to the second embodiment of the present invention does not change angles of the indicator needles 52 to 55 by controlling the driver 35 when the power is turned on by a user. As a result, each indicator needle keeps its angle as pointed right before the power is turned off. Accordingly, each indicator needle is in a position to point the shooting condition set and the number of remaining frames right before power-off even while the power is off.

According to the digital still camera regarding the second embodiment of the present invention as described above, it is possible to check the shooting conditions as set right before the power is turned off even during the power-off. For example, after taking pictures and turning off the power, when a user wants to check again whether the shooting conditions under which pictures have been taken are not the currently intended shooting conditions, it is not necessary to turn on the power for checking according to the digital still camera of the second embodiment. Accordingly, even while the power is off, it is possible to easily check the shooting conditions.

Further, according to the digital still camera of the second embodiment, it is possible to check the number of remaining frames right before the power is turned off even during the power-off. A user can determine a timing to check the number of remaining frames by his or her needs regardless of whether the power is on or off. Accordingly, it happens that a user wants to check the number of remaining frames when the power is off. In such case, according to the digital still camera of the second embodiment, there is no need to turn on the power for checking. Accordingly, it is possible to easily check the number of remaining frames even if the power is off.

What is claimed is:

1. A digital camera, comprising: an image pick-up unit that converts an optical image formed by an optical system to a digital image with data amount which is based on a shooting condition; a storage unit that stores the digital image; a display unit that includes a display panel on which graduations representing the number of frames are marked and an indicator needle; and a driving unit that indicates the remaining digital image frame number, to be stored in the storage unit, by using the indicator needle;

wherein the driving unit drives the indicator needle so as to point to the graduations to indicate the remaining digital image frame number calculated on the basis of remaining capacity of the storage unit and the shooting condition;

wherein the graduations are marked so that the number of frames represented by a unit interval between graduations increases from a starting point to an ending point of the graduations;

wherein the graduations marked on the display panel are at least four graduations defining plurality of divisions therebetween; and wherein the number of frames represented by a unit interval are fixed in each of the divisions.

2. The digital camera as set forth in claim 1, wherein the graduations are marked with respect to each number of frames falls within predetermined range.

3. The digital camera as set forth in claim 1, wherein the driving unit drives the indicator needle so as to point out a predetermined position when the power is turned off.

4. The digital camera as set forth in claim 1, wherein the number of remaining frames is indicated by the indicator needle even during the power-off.

5. The digital camera as set forth in claim 1, wherein the number of frames represented by the unit interval is 1 in a range from 0 to 10, in a case where the unit interval represents 10 frames in a range from 10 to 20.

6. The digital camera as set forth in claim 1, wherein the number of frames represented b the unit interval is 2 in a range from 0 to 10 in a case where the unit interval represents 10 frames in a range from 10 to 20.

* * * * *